United States Patent [19]

Toyoda et al.

[11] Patent Number: 4,471,382

[45] Date of Patent: Sep. 11, 1984

[54] DATA RECORDING DEVICE FOR ELECTRONIC CAMERA

[75] Inventors: Kenji Toyoda, Chigasaki; Takao Watanabe, Koshigaya; Hideya Inoue, Kawasaki; Atsumi Kasuya, Tokyo; Yutaka Ichihara, Yokohama; Akira Miyaji, Tokyo, all of Japan

[73] Assignee: Nippon Kogaku K. K., Tokyo, Japan

[21] Appl. No.: 327,619

[22] Filed: Dec. 4, 1981

[30] Foreign Application Priority Data

Dec. 10, 1980 [JP] Japan ................................. 55-174300

[51] Int. Cl.³ .............................................. H04N 7/08
[52] U.S. Cl. ..................................... 358/183; 358/22
[58] Field of Search ............... 358/213, 214, 183, 188, 358/142, 146, 147, 224, 22, 310, 332, 333, 335, 345, 906; 340/711, 712, 721, 747, 748, 790

[56] References Cited

U.S. PATENT DOCUMENTS

| | | | |
|---|---|---|---|
| 3,833,360 | 9/1974 | Tickle | 358/183 |
| 3,898,644 | 8/1975 | Baxter | 358/183 |
| 3,911,419 | 10/1975 | Bates | 358/183 |
| 4,064,540 | 12/1977 | Jetten | 358/146 |
| 4,245,252 | 1/1981 | Nagumo | 358/163 |
| 4,366,501 | 12/1982 | Tsunekawa | 358/310 |

FOREIGN PATENT DOCUMENTS 112080 8/1980 Japan ................................. 358/183

*Primary Examiner*—Tommy P. Chin
*Attorney, Agent, or Firm*—Shapiro and Shapiro

[57] ABSTRACT

An electronic camera comprises an imaging optical system, image-pickup means for converting an optical image formed by the optical system into an electric image signal, memory means capable of recording the electric image signal, trigger means adapted to be actuated for transferring the electric image signal corresponding to a still optical image to the memory means and means for inserting data into the electric image signal thus transferred. The inserting means comprises means for replacing a part of the recorded electric image signal with "framed" or "unframed" data.

5 Claims, 8 Drawing Figures

DATA RECORDING DEVICE FOR ELECTRONIC CAMERA

BACKGROUND OF THE INVENTION

1. Field of the Invention

The present invention relates to an electronic camera in which the image of an object formed by an imaging optical system is converted into and stored as an electric image signal, and more particularly to a data recording device adapted for use in such electronic camera for recording the data such as date in a picture taken by the camera.

2. Description of the Prior Art

In a conventional still camera in which an optical image is formed on a photosensitive film for recording of said image through a chemical process, it is possible to record data such as the date in a photograph by forming an optical image representing said data on the photosensitive film. If the photosensitive film is transmissive to light, such as a roll film, the recording can be achieved by an exposure from the rear side of the film not having the photographic emulsion, so that light-emitting elements such as LED's or a data recording optical system can be positioned behind the photographic film in an ordinary camera to record the data by overlapping the light from said elements or optical system with the image of the object.

However, such technology for data recording is not applicable to an electronic camera in which an optical image is formed on a solid-state image sensor such as a charge-coupled device (CCD) for conversion into and storage as an electric image signal as disclosed in the U.S. patent application Ser. No. 891,705 of Mar. 30, 1978 now U.S. Pat. No. 4,262,301 issued Apr. 14, 1981, corresponding to the Japanese Patent Laid-Open 136325/1979, since the image sensor has no photosensitivity on the rear face thereof.

SUMMARY OF THE INVENTION

The object of the present invention is to provide a data recording device adapted for use in an electronic camera capable of converting an optical image into an electric image signal and storing said signal as electronic data.

Another object of the present invention is to provide an electronic camera capable of providing a still picture containing arbitrary data not obtainable from the optical image of the object, by replacing the electric image signal in the position corresponding to said data with the signal representing said data and recording thus selectively replaced signal.

According to the present invention the signal representing said data has the same form as the electric image signal representing the optical image in order to enable said signal replacement.

DETAILED DESCRIPTION OF THE PREFERRED EMBODIMENTS

Now the present invention will be clarified in detail by the following description to be taken in conjunction with the attached drawings.

Figure 1:
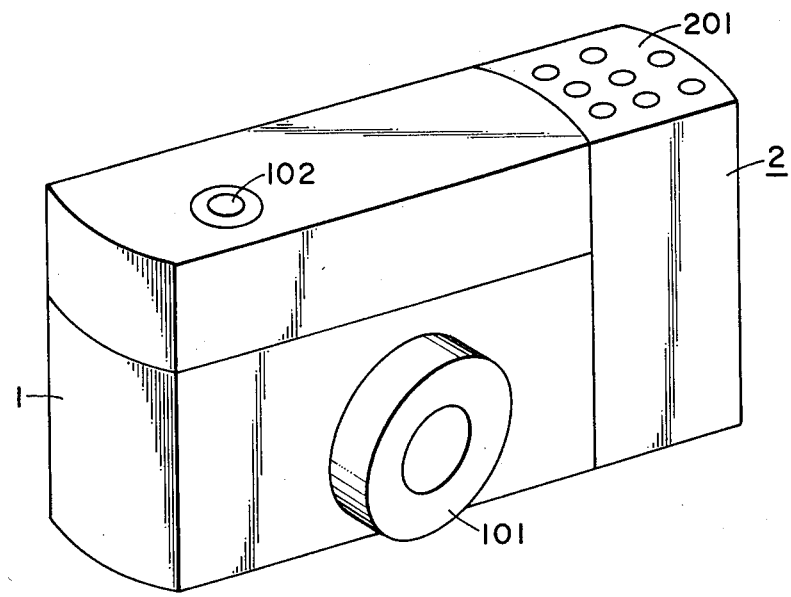
FIG. 1 is a front perspective view of an electronic camera embodying the present invention.

Referring to FIG. 1, a camera 1 is provided on the front face thereof with phototaking lens 101, and on the upper face thereof with a trigger button 102 for starting the phototaking operation. Said camera 1 is further provided with a detachable data recording unit 2 which is provided, on the upper face thereof, with a mode selecting keyboard 201 for selecting the position and arrangement of data to be recorded in the picture to be taken.

Figure 2:
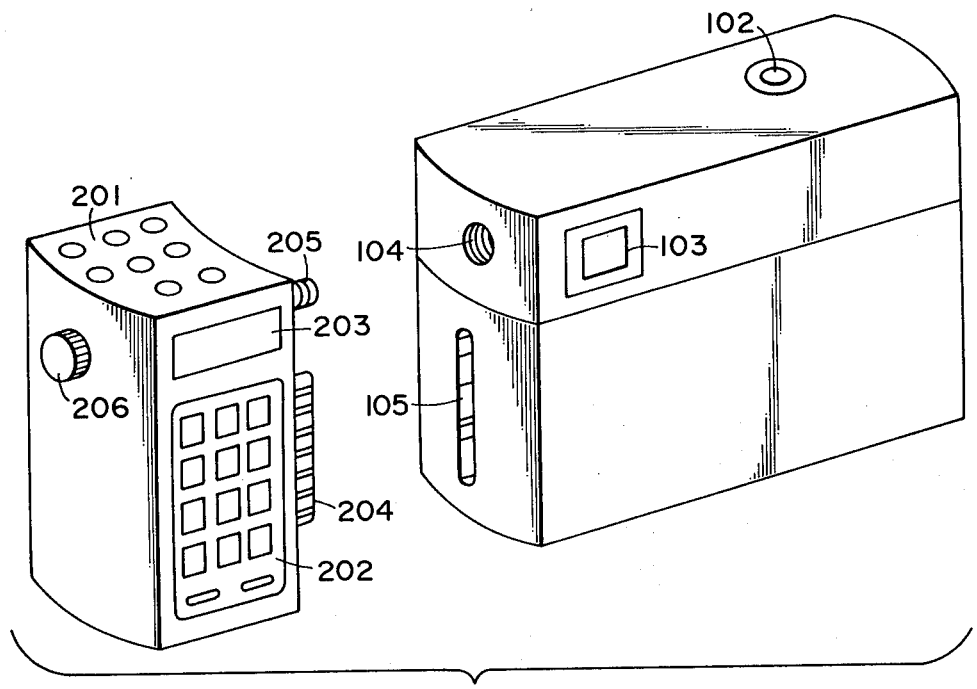
FIG. 2 is a rear perspective view of said camera in which a data recording unit is shown detached.

FIG. 2 shows said electronic camera 1 from which the data recording unit 2 is detached. As shown in the drawing, the camera 1 is provided on the rear face thereof with an eyepiece 103 of an electronic view finder, and on the left-hand face thereof with a female screw 104 for mounting the data recording unit and a connector 105 for transmitting various signals.

On the rear face of said data recording unit 2 there are provided a data entry keyboard 202 for selecting the data to be recorded and a display unit 203 for indicating the data selected by said keyboard 202 and the recording mode selected by said keyboard 201. Said data recording unit 2 is further provided on the right-hand face thereof with a protruding connector 204 to be engaged with the connector 105 of the camera and a male screw 205 which is rotated by a knob 206 provided on the left-hand face for fitting with said female screw 104.

Figure 3:
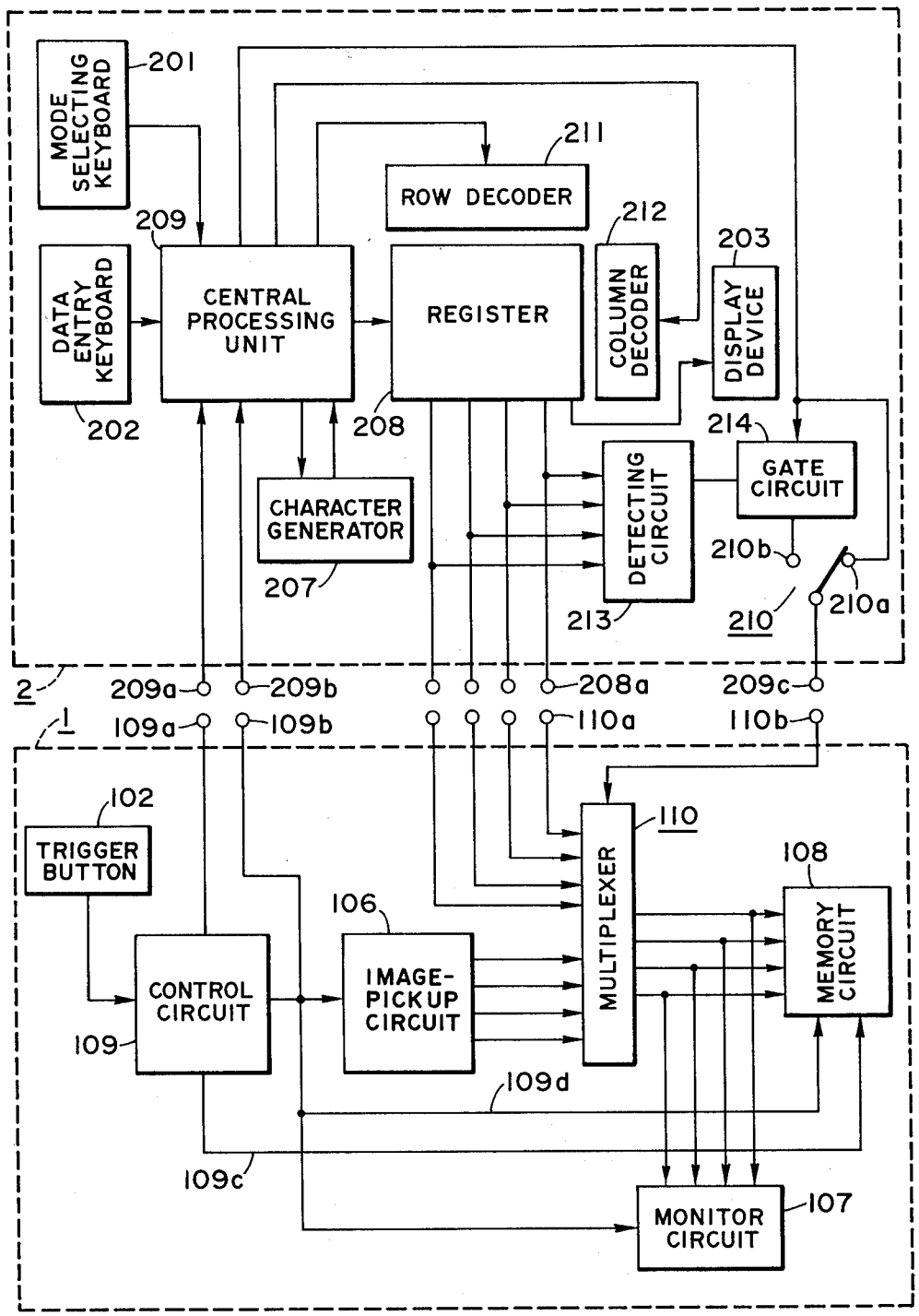
FIG. 3 is a block diagram showing an embodiment of the circuit of the camera and the data recording unit.

FIG. 3 shows the circuit in the electronic camera 1 and the data recording unit 2. In the camera 1 there are provided an image-pickup circuit 106, a monitor circuit 107, a memory circuit 108 and a control circuit 109. The image-pickup circuit 106 photoelectrically converts the image of an object formed by the phototaking lens 101 through an image sensor such as a charge-coupled device and outputs the thus converted signal as 4-bit digital image signal. The monitor circuit 107 is provided with a display device such as a liquid crystal matrix to display the entered image signal so as to be observable through the eyepiece 103. The memory circuit 108 comprises a read-write memory such as a random access memory capable of storing image signals of plural frames. The control circuit 109 controls the above-mentioned circuits according to predetermined sequences in response to the actuation of the trigger button 102.

The data recording unit 2 is provided with a character generator 207, a register 208, a data entry keyboard 202, a mode selecting keyboard 201, a central processing unit (CPU) 209 for controlling elements 207, 208 etc. according to the signals from said keyboards etc.

Figure 4:
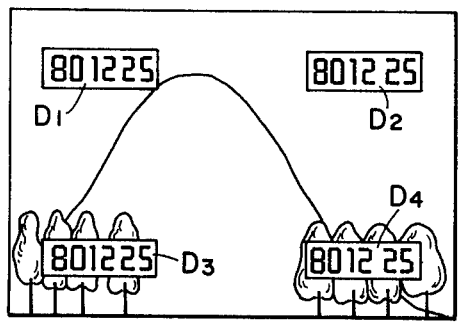
FIGS. 4 to 7 are views showing various data recording modes in the image picture.
Figure 5:
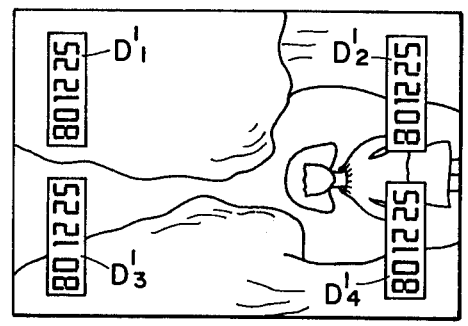

FIGS. 4 to 7 illustrate various modes of data recording to be selected by the mode selecting keyboard 201. If the picture to be taken is horizontally oblong as shown in FIG. 4, the data D1–D4 are arranged parallel to the longer side, while if the picture is vertically oblong as shown in FIG. 5 the data D1'–D4' are arranged parallel to the shorter side. Also the data can be recorded in any of the four corners D1–D4 or D1'–D4' according to the picture composition as shown in FIGS. 4 and 5.

Figure 6:
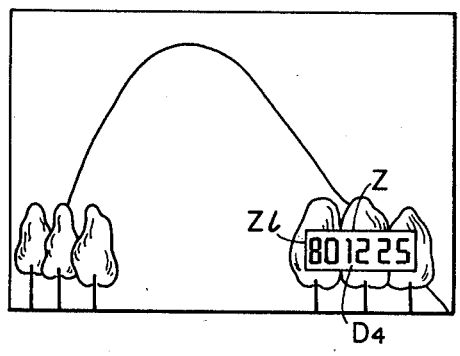
Figure 7:
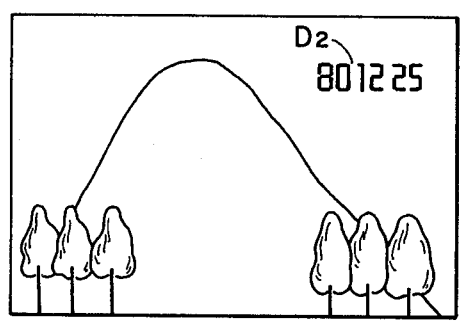
Figure 8:
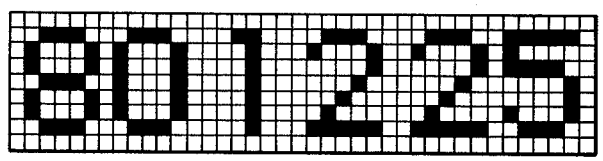
FIG. 8 is a view showing data composed of a dot matrix.

In FIG. 6 is shown a framed mode in which a predetermined area Z in the object image in the picture is cut out as a frame for data recording, while in FIG. 7 is shown a frameless mode in which data are directly overlapped on the object image.

In this manner the keyboard 201 can select the data recording in one of four corners of the picture, in a vertical or a horizontal direction and in a framed or a frameless mode.

Now there will be given an explanation of the phototaking and data recording while making reference principally to FIG. 3.

At first the data recording unit 2 is mounted on the camera 1, whereby output terminals 109a, 109b of the control circuit 109 in the camera 1 are respectively connected with input terminals 209a, 209b of the CPU 209 in the data recording unit 2. Similarly, data input terminals 110a and a data select input terminal 110b are respectively connected to output terminals 208a of the register 208 and an output terminal 209c of the CPU 209. Upon selection of characters and/or numerals to be recorded on the data entry keyboard 202, a coded data signal is supplied through the CPU 209 to the character generator 207, which in response transmits the corresponding data signal in dot matrix representation to the register 208 through the CPU 209. Said register 208 is provided with a capacity capable of covering the entire data area Z. For example a display of 6 characters each composed of a 5×7 array of dots, with one-dot space there-around and two-dot spaces between every two characters requires a capacity of 39×9 dots, or 78×18 picture elements if 4 picture elements are allotted to each dot, in said register 208.

Then the mode selecting keyboard 201 is actuated for selecting the position and arrangement of the data as shown in FIGS. 4 to 7, whereby the output signal of said keyboard 201 corresponding to the thus selected mode is stored in a register in the CPU 209.

The data and the mode selected in said keyboards 202, 201 are displayed in the display device 203.

A first stroke in the depression of the trigger button 102 initiates the power supply to the entire circuit in the camera 1, and causes the control circuit 109 to output a synchronizing pulse to the image-pickup circuit 106, which thus initiates the photoelectric conversion in the image sensor composed for example of a charge-coupled device. Upon completion of said conversion, the output signal constituting picture signal of one frame is sent, in the form of 4-bit digital signals, from the output terminals of said image sensor to the input terminals of the multiplexer 110, which in this state transmits the entered image signal to the monitor circuit 107. Said monitor circuit 107 is driven by the synchronizing pulse signals from the control circuit 109 to display said image signal on the display device for observation through the eyepiece 103. As long as the trigger button 102 is maintained depressed in said first-stroke position, the picture signal is repeatedly supplied from the image-pickup circuit 106 to the monitor circuit 107 through the multiplexer 110 at a frequency of a motion picture so that the operator can observe the image of the object as a motion picture through said eyepiece 103. The picture signal from the image-pickup circuit 106 is also supplied through the multiplexer 110 to the input terminal of the memory circuit 108, which however is in the waiting state and does not accept said picture signal.

Simultaneously with the start of picture signal transfers from the image-pickup circuit 106 to the multiplexer 110, a transfer start signal is supplied from the control circuit 109 through the terminals 109a and 209a to the CPU 209, which also receives synchronizing pulse signals through the terminals 109b and 209b synchronized with the transfer of the picture signal from said image-pickup circuit 106. Upon detection of said transfer start signal, the CPU 209 starts to count the synchronizing pulses, and, upon detection that the transferred picture signal reaches the data recording position selected by the mode selecting keyboard 201, for example an end position Z1 of the data area Z shown in FIG. 6, the CPU 209 sends a data insertion signal through the switch 210 (used in selecting "framed" or "unframed" modes of data recording) and terminal 209c to the data select input terminal 110b of the multiplexer 110 thereby terminating the transfer of picture signal from the image-pickup circuit 106 and enabling the signal entry from the register 208. At the same time, the CPU supplies an X-address signal and a Y-address signal respectively to a row decoder 211 and a column decoder 212 for successively selecting the X-addresses (9 dots or 18 pixels in the cross direction of the data to be recorded) and Y-addresses (39 dots or 78 picture elements in the longitudinal direction of the data) in the register 208. The stored signals thus selected are supplied as data signals from the output terminals 208a of the register 208 to the data input terminals 110a of the multiplexer, and are further supplied to the monitor circuit 107, replacing a part of the picture signal. The picture signal from the image-pickup circuit, reproduced on the display device in a scanning process similar to the NTSC system, is partly replaced by the data signal in the course of said scanning, thus showing, in the electronic view finder, the image of the object as a motion picture with data inserted therein.

If the data are arranged as shown in FIG. 4, the horizontal scanning and the vertical scanning of the picture signal should be respectively synchronized with the selection of the X-addresses and Y-addresses in order to synchronize the scanning of the data signal with the scanning of the picture signal. More specifically the Y-address is fixed when the horizontal scanning line of the picture signal reaches an end Z1 of the data area, and the X-addresses of said data area are selected in succession from said end Z1 in synchronization with the horizontal scanning of the picture signal. Thereafter the X-addresses are repeatedly selected with the stepwise advanced Y-address each time the horizontal scanning line of the picture signal reaches said end point Z1.

Also, if the data are arranged as shown in FIG. 5, the Y-addresses and the X-addresses are to be synchronized respectively with the horizontal scanning and the vertical scanning of the picture signal. Thus the X-address is fixed when the horizontal scanning line of the picture signal reaches the data recording area, and the Y-addresses are selected in succession in synchronization with the horizontal scanning. Thereafter the Y-addresses are similarly selected with a stepwise advanced X-address each time the horizontal scanning of the image signal reaches the data recording area.

When the framed mode as shown in FIGS. 4 to 6 is selected by the keyboard 201, the switch 210 shown in FIG. 3 is connected to the terminal 210a thereof for transmitting a data insertion signal from CPU 209 directly to the multiplexer 110 so that the multiplexer blocks the picture signal from the image-pickup circuit 106 during the "framed" area (see Z in FIG. 6) and passes the data signal from the register 208 during the data insertion signal.

On the other hand, when the frameless mode as shown in FIG. 7 is selected by the keyboard 201, the switch 210 is connected to the terminal 210b thereof. Between the output terminal of the CPU 209 and the terminal 210b there is provided a gate circuit 214 controlled by a detecting circuit 213, which, in response to the data signal from the register 208, opens the gate circuit 214 only when the signal corresponding to character dots is outputted. Consequently the data select input terminal 110b of the multiplexer receives the data insertion signal only at this point to send the data signal corresponding to the character dots to the monitor circuit instead of the picture signal.

If the image and the inserted data observed through the eyepiece 103 of the view finder are satisfactory, the trigger button 102 is pressed down further from the first stroke to a second stroke, whereby the control circuit outputs a write-in instruction signal and synchronizing pulse signals respectively from the output terminals 109c and 109d to the memory circuit. In response the memory circuit 108 stores one frame of the picture signal and the data signal supplied from the multiplexer 110.

Upon completion of said storage, the control circuit terminates the supply of synchronizing pulse signals, thus completing the phototaking operation. The picture display is interrupted during said storing operation but is restored if the trigger button is maintained in pressed state, thus advising the operator of the completion of the phototaking operation.

We claim:

1. In an electronic camera provided with an image-pickup device for converting an image of an object into an electric image signal, apparatus for recording said image signal in representation of a still picture image of the object and for recording data on said still picture image, said apparatus comprising memory means for storing said electric image signal, means for transferring the electric image signal from said image-pickup device to said memory means for storage therein, means for producing a data signal dependent upon data to be recorded, and means coupled to said data signal producing means and to said transferring means for controlling said transferring means to modify the transfer of said electric image signal so as to store said data signal in said memory means in accordance with a first mode or a second mode, selectively, the first mode modifying the transfer so that data are stored in said memory means only at positions at which data are to be represented in said still picture image, the second mode modifying said transfer so that the data signal stored in said memory means represents said data in a frame area of said still picture image that frames the data.

2. An electronic camera according to claim 1, wherein said image-pickup device and said data signal producing means are adapted to generate said electric image and data signals in a time-sequential manner and in synchronism, and wherein detection means detects the production of said data signal and produces a detection signal that is connected to said transferring means to modify said transfer in said first mode.

3. An electronic camera according to claim 2, wherein said transferring means comprises a multiplexer.

4. An electronic camera according to claim 1, wherein said image-pickup device and said data signal producing means are adapted to generate said electric image and data signals in a time-sequential manner and in synchronism, and wherein said controlling means, when said second mode is selected, causes said data signal to be applied to said transferring means to block the transfer of said electric image signal to said memory means at times corresponding to said frame area as well as at times corresponding to said data.

5. An electronic camera according to claim 4, wherein said transferring means comprises a multiplexer.

* * * * *